United States Patent [19]

Anderson et al.

[11] Patent Number: 4,921,668
[45] Date of Patent: May 1, 1990

[54] PROCESS FOR FLAME TREATING

[75] Inventors: Robert K. Anderson, Signal Mountain; Michael H. Mainz, Chattanooga, both of Tenn.; Robert L. Rackley, Parkersburg, W. Va.

[73] Assignee: E. I. du Pont de Nemours and Company, Wilmington, Del.

[21] Appl. No.: 106,653

[22] Filed: Oct. 13, 1987

[51] Int. Cl.$^5$ .................. D01F 6/60; D01D 5/12; D01D 10/02
[52] U.S. Cl. .................. 264/80; 264/178 F; 264/210.2; 264/210.5; 264/210.7; 264/210.8; 264/211.15; 264/211.17
[58] Field of Search .......... 264/80, 178 F, 205, 264/210.2, 210.5, 210.7, 210.8, 211.15, 211.17, 234, 235, 345, 346

[56] References Cited

U.S. PATENT DOCUMENTS

| | | | |
|---|---|---|---|
| 3,153,106 | 10/1964 | Schlick | 264/78 |
| 3,539,668 | 11/1970 | Hayman | 264/80 |
| 3,662,055 | 5/1972 | Bates | 264/167 |
| 4,009,511 | 3/1977 | Gauntt | 264/210 F |
| 4,056,652 | 11/1977 | Gauntt | 428/400 |
| 4,338,277 | 7/1982 | Saito et al. | 264/235.6 |

FOREIGN PATENT DOCUMENTS

| | | |
|---|---|---|
| 627298 | 12/1979 | Japan . |
| 457689 | 3/1980 | Japan . |
| 57-35014 | 2/1982 | Japan . |
| 58-136827 | 8/1983 | Japan . |
| 58-144111 | 8/1983 | Japan . |

Primary Examiner—Hubert C. Lorin

[57] ABSTRACT

An improved process comprising flame treating monofilaments from which a preferred product is a heavy denier transparent polyamide monofilament, especially suitable as fishing line.

8 Claims, 1 Drawing Sheet

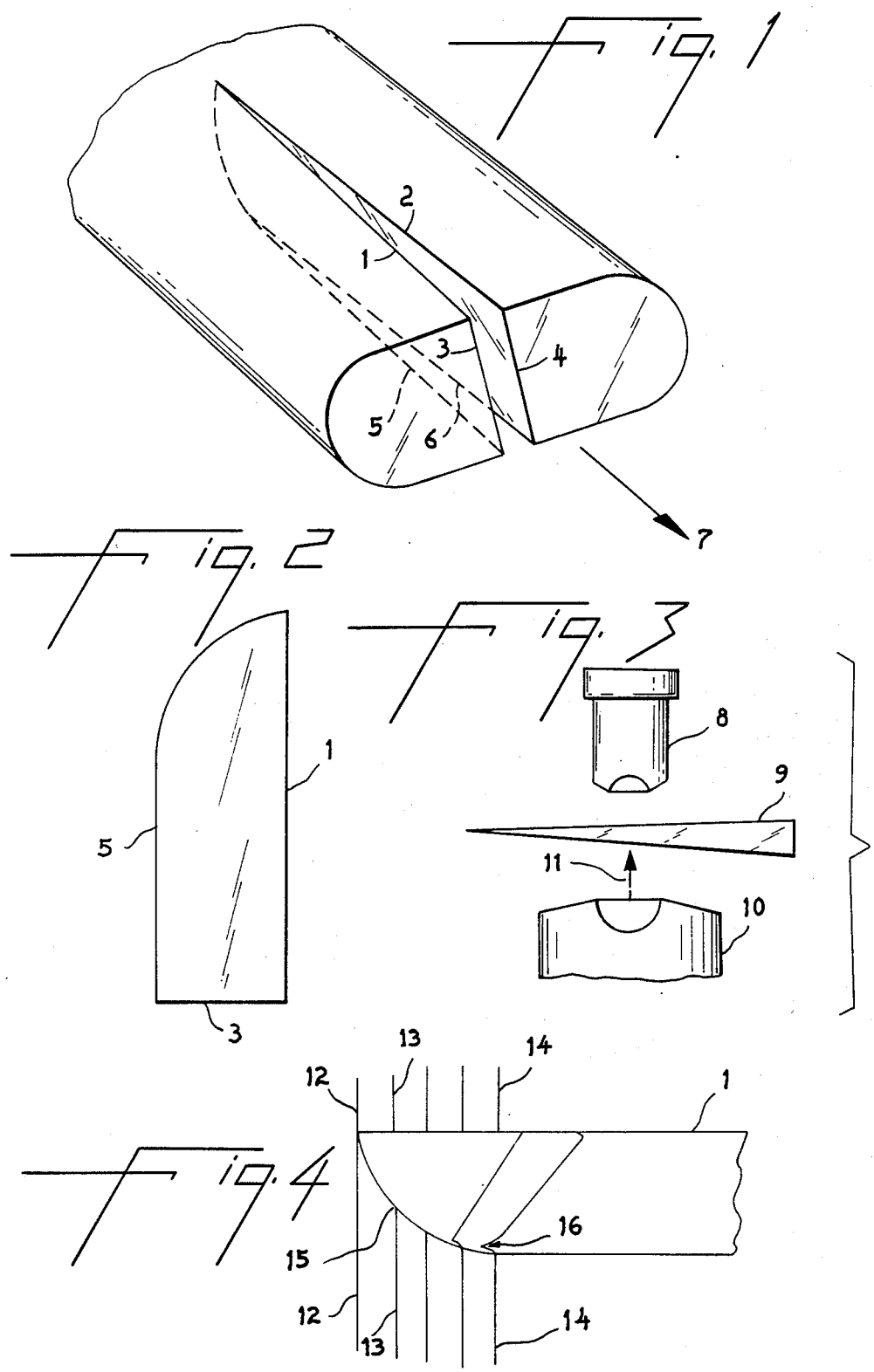

PROCESS FOR FLAME TREATING

TECHNICAL FIELD

This invention relates generally to a process for flame treating monofilaments and more particularly to polyamide monofilaments which are suitable for use as fishing line and other applications.

BACKGROUND

Heavy denier monofilaments useful in such applications as tires and fishing line have been described in U.S. Pat. Nos. 4,009,511 and 4,056,652 to Gauntt and U.S. Pat. No. 4,338,277 to Saito et al. The monofilaments of Gauntt are made by a process of spinning, quenching and drawing a heavy denier, aliphatic polyamide monofilament in first and second draw stages to a total draw ratio of at least 5.5X. In the Gauntt process the monofilament is water-quenched and then advanced in a first draw stage through a pressurized, surface-plasticizing steam atmosphere and orientation-stretched at a ratio of a least 3.5X. The monofilament is then advanced in a second draw stage through a zone heated with a radiant heater at a temperature of 700° C.-1300° C. where it is orientation-stretched at a ratio of at least 1.3X.

Where the aliphatic polyamide is polyhexamethylene adipamide the Gauntt process produces a monofilament having a denier greater than 1000, having a polymer surface layer 3 to 15 microns thick and a parallel refractive index, $n \parallel$, of 1.547-1.567 and the core polymer has a parallel refractive index, $n \parallel$, of greater than 1.57.

The Gauntt monofilament is suitable as tire yarn but is not as desirable as fishing line because it is not sufficiently transparent.

Conventional sports fishing lines are typically round cross-section monofilaments made from nylon 6 (polycaproamide) and its copolymers. Nylon 6 lines have been preferred because of their greater flexibility. Nylon 6 lines having a non-round, ribbon-like cross-section had been sold in the late 1950's, before the spinning reel became so popular. By contrast to the experience with nylon 6, nylon 66 monofilament has not been used commercially as fishing line because it has not been flexible enough to permit efficient casting and winding.

SUMMARY OF THE INVENTION

An improved process for making monofilament, suitable for use in fishing line and other applications has been discovered. The process includes the steps of spinning, quenching, surface drying and drawing a heavy denier thermoplastic monofilament in at least two draw stages to a total draw ratio of at least 5.0X. The monofilament is liquid quenched, preferably with water, the monofilament surface is dried and in one or more draw stages the advancing quenched monofilament is optionally heated and orientation-stretched at a ratio of at least 3.0X. The monofilament is then advanced in one or more additional draw stage(s) through a zone heated with a radiant heater at a temperature of 600°-1300° C. wherein the monofilament is orientation-stretched at a ratio of at least 1.3X. The improvement comprises drying the monofilament surface after quenching the monofilament and heating the quenched and surface dried monofilament by flame before the last at least 1.3X increment of draw. The monofilament surface temperature is preferably from 20° C. below the melting point to 40° C. above the melting point of the monofilament as it leaves the flame.

The invention is applicable to drawable fiber-forming thermoplastic polymers and, in particular, polyamides, polyesters, and polyolefins wherein a compact, environmentally clean process is required to make a monofilament with high straight and knot tensile properties. Polyamides useful in this invention have a relative viscosity (ratio of solution and solvent viscosities in a capillary viscometer at 25° C. using an 8.4% by weight solution of polymer dissolved in formic acid containing 10% by weight of water) of about 50 or more and preferably 70 or more. The polyamides are the polymers of diamines and dicarboxylic acids or the functional equivalents of dicarboxylic acids such as dicarboxylic acid chlorides or diamides, or of amino acids or lactams, and copolymers thereof. Suitable polyamides are polyhexamethylene adipamide (6,6 nylon), polytetramethylene adipamide (4,6 nylon) and poly-e-caproamide (6 nylon) and copolymers thereof. For 6,6 nylon, melt processing temperatures ranging from 270° to about 300° C. are operable.

The polyamide filament is melt spun through either a round, obround or rectangular (rounded corners), or other such relatively large spinneret orifice, subjected to attenuation in an air gap below the spinneret and quenched in a liquid, preferably water, bath at a temperature less than 50° C. (for 6,6 nylon). The air gap is 10 to 40 inches (25-100 cm) in length and distance traveled in the water bath is greater than 80 inches (200 cm). The optimum air gap and distance traveled in the water will obviously vary with different polymers, process speeds, melt temperatures, etc. Tension in the air gap and water bath is minimized in order to also minimize development of molecular orientation in the filament surface which would inhibit subsequent orientation stretching and development of strength in the filament.

Prior to the first stage of drawing or, at least, prior to flame treatment of the filament, substantially all liquid must be removed from the filament surface or subsequent treatment with a flame will be ineffective. Liquid can be removed, for example, by air jets and/or felt wipers dried by vacuum. Dryness can be determined by touching the filament with a medium shade cotton cloth for several seconds; any liquid will make a dark spot on the cloth.

Following drying and prior to at least the last 1.3X increment of draw, the filament is passed through one or more flames to substantially eliminate surface orientation developed during quenching which might otherwise lead to draw breaks, poor process continuity, and/or other poor filament properties. It was found that pairs of flames directed at the top and bottom of the filament simultaneously were preferred. Although it is possible to use any of the large range of fuels for the flame, it was found that pairs of oxyacetylene flames were particularly useful. In a preferred mode, the flame orifice pairs are approximately one inch apart, aimed counter to the filament motion, with an included angle of 45-90 degrees. The filament is aligned to pass between the tips on the bisector of the included angle. If the filament has a non-round cross-section, the wider surfaces should preferably face the flames. The exact shape of the flames and distance of the flame from the filament surface is empirically established to yield maximum straight and knot tensiles. It is believed that the optimum conditions result in a filament surface temperature from very near the melting point (within 20° C.) of the filament to as high as 40° C. above the melting point. The high temperature attained by the surface, as well as the core, assists orientation-stretching through subsequent stages of draw. In a preferred embodiment, the flames are used in the first stage of draw; the speed of the monofilaments is slowest in that stage and it is easier to effect the heating. When so used, the actual draw point is after the flame treatment, generally within 6 inches of the point at which the flame impinges on the filament surface; this distance will, however, vary depending on the filament temperature going into the flame as determined by the air and water quench conditions, by denier, by processing speed, and by the extent of draw (i.e. draw tension) in the first stage. Other fuels may also be used for the flame depending on the temperature desired, polymer used, process speed, etc. An enclosure around the flame(s) is not required but may be useful from a safety point of view and to remove combustion gases.

Among the key advantages of the flame over other techniques used previously are the environmentally clean nature of the flame and the compactness and simplicity of the process. Further, the compactness of the flame unit allows more production units to be built in the same amount of space (increased efficiency and lower costs) as well as allowing some existing spinning units to be retrofitted to produce monofilaments. The flame unit will also generally be easier to use on a continuing basis because of the simple mechanics involved versus a steam unit, the latter requiring opening and sealing of the pressure chamber each time a position is strung up. Thus added advantages include improved efficiency and yields, and lower manufacturing costs.

In the two-stage drawing process the amount of draw in the first stage should be in the range of 3.5 to 4.2X for 6,6 nylon, preferably about 3.8X for optimum tensile properties in this process. Optionally, the first stage draw rolls are heated in order to preheat the filament prior to entering the radiant heater in the second stage. This serves to primarily lessen the load on the radiant heater but is not required for optimum product or process performance. It is important to bring the core temperature of the filament to a certain level during second stage drawing to allow sufficient drawing for optimum straight tensiles while bringing the surface to a high enough temperature to deorient the surface for optimum knot tensiles.

The heating in the second stage stretching involves the use of a radiant heater at a temperature of 600°-1300° C., with an exposure time such that the filament surface temperature remains about 5°-50° C. below the melting point of the polymer. One such suitable heater has resistance coils enclosed in and anchored with respect to an interiorly insulated, cylindrical casing which radiates heat onto the filament. The actual construction, length, number of passes etc. through the heater may be varied as desired as long as the filament surface temperature reaches 200°-255° C. (for 6,6 nylon), preferably 230°-255° C. Temperatures for other polymers would have to be adjusted based on their melting points. The molecular deorientation of the surface resulting from the combination of flame treatment and radiant heating allows the filament to be drawn at least 1.3X in the second stage without increasing break levels. This results in a further increase in overall molecular orientation and straight tenacity while maintaining, or even increasing knot tenacity.

A preferred product of this invention is a polyamide monofilament, more preferably polyhexamethyalene adipamide, having a denier greater than 100, preferably 1000-6000, and characterized by a transparent appearance as indicated by a Transmitted Light Value of at least 67%, a straight tenacity of greater than 7 gpd, preferably greater than 8 gpd, knot tenacity >4 gpd, and a polymer surface layer less than about 40 microns thick. The surface layer has a parallel refractive index less than that of the core. The monofilament cross-section can be of any shape, but substantially flat ribbon-shaped cross section is preferred for selected applications where increased flexibility is desired.

To achieve the high levels of clarity and transmittance characteristic of the monofilaments of the flame process of this invention, such monofilaments should be substantially free of delusterants, pigments, dyes or other additives which reduce transmittance, such as titanium dioxide, etc. Typical levels of polymerization catalysts (such as phosphorus compounds) or stabilizer materials (such as phenolic derivatives or copper salts) in the polymer do not appear to reduce monofilament transmittance significantly. It is important to exercise control of temperature, tension and smoothness of roll and guide surfaces in order to minimize surface damage and to obtain smooth, clear filaments.

The product of the process is clear and transparent. It has an optically visible surface layer having a thickness of less than 40 microns, preferably 3-40 microns, which has reduced orientation relative to the filament core. Said surface is also less porous than that produced by steam treatment.

The orientation of the surface layer described herein is less than that of the core as measured by the parallel component of the refractive index. Said surface is also distinctly different from that of a steam treated product in terms of surface porosity. This can be demonstrated by comparing adhesion of samples in rubber, adhesion being a sensitive measure of the structural characteristics of a surface. Using a standard 2-ply adhesion test, the flame treated samples will have a hot 2-ply strip adhesion of less than 44 lbs. (2 N). Generally the flame treated samples are 20-80% lower in adhesion than steam treated samples described by Gauntt. Better adhesion of steam treated samples is believed due to the diffusion of water into the surface of steam treated samples which creates "holes" between fiber material, this effect being further enhanced by evaporation of water during subsequent high temperature steps in the process.

The high strength monofilaments of the invention have a denier greater than about 100, preferably 1000 to 6000 for most common end-uses, but may be as high as 15,000. These products are particularly useful for fishing lines wherein the combination of high strength (straight tensile and knot), transparency and lower index of refraction of the surface versus core are unique. This product will also be useful in other uses requiring an easily workable strength member or reinforcing material. Other potential end uses are ropes, cables, bristles, tire cords, etc.

A process for fishing comprising casting a line with an attached lure from a casting reel into the water, the improvement wherein the line comprises at least 70% nylon 66 having a non-round filament cross-section and a modification ratio of at least 2.0 has now been discovered. The modification ratio is defined as the ratio of the diameter of the major axis of the monofilament cross-section divided by diameter of the minor axis. A ribbon-like cross-section is preferred. Strength, durability, knottability and sensitivity of the nylon 66 line with a ribbon-like cross-section were all rated excellent in fishing trials opposite commercial nylon 6 line. Castability was particularly outstanding in that the high-test 6,6 nylon line (40 lbs.) had the casting properties of a relatively light-test nylon 6 line (14 lbs.). It is believed that the non-round, flat, ribbon-like cross-section increases the flexibility and thereby improves the castability. For satisfactory flexibility and castability, the modification ratio of nylon 66 monofilament fishing line should be at least 2.0. A modification ratio of at least 2.5 is preferred, and at least 3.0 is most preferred.

Test Methods

Optical Clarity (% Transmitted Light)

Relative differences in fiber clarity were determined by measuring the amount of light transmitted through the fiber using an optical microscope (Leitz "Dialux" or equivalent) fitted with a photometer (Leitz MPV compact, or equivalent). A special feature of this photometer system allows the observation of the adjustable, illuminated four-leaf rectangular diaphragm together with the image of the fiber surface. For this work, photometric measurements were made with a x6.3 objective and x10 eyepieces with the diaphragm dimensions corresponding to 0.085 mm × 0.78 mm as measured with a Bausch & Lomb calibration slide.

The fiber was mounted on a standard microscope slide without cover-slip or immersion oil. With the microscope focused on the upper surface of the fiber, the substage condenser is set for Koehler illumination with the top condenser element swung out of the optic train. Photometric mesurements should be made with the substage condenser iris diaphragm in its fully open position.

The photometer was calibrated by positioning the slide to an empty field of view and regulating the gain until the digital display (in volts) indicates 100. After blocking the photometer, the dark current is then set to 0. The measurements were obtained by positioning the fiber so that the illuminated rectangular slit was superimposed on the central region of the fiber and its long axis was parallel to the fiber axis. An attempt was made to exclude from measurement portions of fiber containing obvious mechanical defects such as might arise from contact with guides, pins and the like whose effect would be to reduce the amount of light transmitted. Three mesurements of transmittance were obtained along a 1" length of five different portions of fiber sampled along the threadline approximately 5 meters in total length.

Hot, 2-Ply Strip Adhesion Test

The test utilized was the same as ASTM Test D-4393-85; Strap Peel Adhesion of Reinforcing Cords or Fabrics to Rubber Compounds (pages 1133-1142; 1985 Annual Book of ASTM Standards, Section 7, Volume 7.01) with a few modifications. The particular variation used was to test individual monofilament tire cords that had been RFL dipped singly. The rubber stock employed was a combination of natural rubber (80 parts by weight), styrene-butadiene rubber (20 parts), N351 Black (35 parts), plus minor amounts of other conventional ingredients. The dipped tire cords were warped so that adjacent cords directly abutted each other. For example, 2,000 denier dipped cord required about 26 ends per inch. After embedment of the cords in the rubber stock, the sample was cured at 160° C.±2° C. for 20 minutes at 1340 kPa pressure. Since hot adhesion was desired, the samples were heated in the Instron oven at 120° C.±2° C. for 25±5 minutes prior to testing. The separation force was based on Option 1 (the mid-line between the high and low peaks of separation force). Eight samples per warp were tested and the results were reported as average force in pounds per inch.

Parallel Refractive Index and Surface Thickness

Where reported herein, the refractive index for light polarized parallel to the filament axis, $n \parallel$ is a measure of orientation within the monofilament. A Leitz double beam interference microscope was used to determine whether the refractive index, $n \parallel$, near the fiber surface is above or below a reference immersion medium. In addition interference fringe displacements were used to interpolate between immersion media or extrapolate a small amount beyond one immersion medium. Immersion liquids used were the Cargille (Cedar Grove, N.J.) Series A liquids. Illumination used was the 0.546 micron wavelength from a high pressure mercury lamp. The immersion liquid refractive indices were assumed to be the value provided by Cargille, i.e. they were not corrected for the wavelength difference between 0.589 microns, where they were calibrated, and the 0.546 micron wavelength illumination used or for the difference between calibration temperature and their temperature during the measurements. Consequently all refractive index values quoted herein, while sufficiently accurate for the purpose, are approximately 0.0047 lower than the absolute refractive indices of the fibers at a wavelength of 0.546 microns. The tests were all run at 23.9±0.5° C.

Measurements were made on wedge-shaped longitudinal sections cut with a razor blade at the minor diameter of the obround or ribbon-like cross-section monofilaments. FIG. 1 shows the location, orientation and shape of a section as it would be made in the case of an obround monofilament. In FIG. 1, arrow 7 represents the monofilament axis. The obround cross-section shown is perpendicular to this axis. Lines 1, 2, 3, 4, 5 and 6 represent the intersections of the cut planes with the surface of the monofilament. Lines 3 and 4 are not exactly parallel to each other. The angles between the two cuts are such that the thickness of the section will gradually taper from 100 micrometers to zero over a distance along the fiber axis of 3-4 mm. FIG. 2 is a plan view of a section cut according to FIG. 1. FIG. 3 shows the arrangement of a wedge-shaped section in the interference microscope. In FIG. 3, 8 represents the objective lens, 9 represents the section, 10 represents the condensor lens and arrow 11 represents the light path in the microscope. Arrow 11 in FIG. 3 is perpendicular to the plane of FIG. 2. FIG. 4 shows the key points of the interference microscope image. In FIG. 4, vertical lines 12, 13 and 14 represent interference fringes. Fringe 12 passes outside of the section, and is straight. Fringe 13, moving from the bottom to the top of the figure, intersects the section at position 15, where the section tapers to zero thickness. This arrangement makes it possible to be certain that a fringe inside of the section is connected with the same fringe outside of the section. Fringe 14 intersects the section at position 16, a place convenient for making measurements on edge 5. Edge 1 is not useful.

When a section made as described above is used, the surface parallel index determined is that on the long side of the obround fiber. The same technique is also applicable to round monofils and to monofils of other shapes. For any of these shapes, the sections should be cut so that optical measurements would be made with the microscope axis parallel to the most important fiber bending axis, e.g. parallel to the bending axis in the knot test.

Two immersion liquids were used, having refractive indices of 1.570 and 1.560. One other liquid with refractive index of 1.548 was used to confirm observations, but was not used in actual calculations. Other liquids might be useful, as the immersion refractive index should be kept within 0.1 of the specimen, particularly in regions like the near surface zone where refractive index can change rapidly with position. To provide a method for extrapolation and interpolation of refractive indices which differ from these liquids, the two liquid method of eliminating geometrical path difference was applied, being careful to keep the measured interference fringes running as nearly as possible over the same region of the section. To apply this method with sufficient accuracy, it is necessary that specimens be prepared carefully. Analysis was done on micrographs at a final magnification of 325-340X. For the values cited in this application, the parallel refractive index of the surface was measured within 5 microns of the fiber surface, while the parallel refractive index of the core was measured within 10% of the distance from the center to the fiber surface on either side of the center of the fiber.

The thickness of the deoriented near-surface layer discussed in this application is the normal distance from the surface to the position where the refractive index changes rapidly to its relatively constant value in the monofilament core and is determined from measurements of the width of the V-shaped fringe, represented as 16 in FIG. 4, on interference micrographs at a magnification of 340X.

Straight and Knot Tensiles

Before tensile testing, the monofilament, while in package form, is conditioned until the yarn reaches equilibrium moisture content in the test atmosphere (usually 5-7 days). The atmosphere is maintained at a temperature of 75±2° F. and a relative humidity of 55±2%. A recording stress/strain device is used wherein a straight 10 inch long section of monofilament is elongated at a rate of 20 in./min. until it breaks. During stress/strain testing, the monofil sample is gripped in air-activated Type 4C Instron clamps maintained at at least 60 psi pressure. Tenacity is computed by dividing the breaking load in grams by the denier of the sample before testing.

The knot tensiles are measured in the same manner as straight tensiles except that a simple knot is tied in the monofilament at about the midpoint of the sample to be tested. The simple knot is made by crossing a length of monofilament on itself at about the midpoint of its length and pulling one end through the loop so formed. Since the monofilament tends to assume some of the curvature of the windup package, the knot is tied with and against this curvature on separate samples as a sensitive measure of uniformity of treatment. If the different modes of tieing the knot yield knot tensile values beyond the normal variability, experimental conditions are adjusted to provide more uniform treatment of the monofilament and more uniform knot tensiles. For example, the flames may have to be adjusted to treat both sides of the monofilament more uniformly.

Relative Viscosity

Relative viscosity, (RV), as used herein, is the ratio of solution and solvent viscosities measured in a capillary viscometer at 25° C. The solvent is formic acid containing 10% by weight of water. The solution is 8.4% by weight polyamide dissolved in the solvent.

EXAMPLES

Example 1

This Example describes the preparation of 6,6-nylon monofilament with a denier of about 2,000 by the process of this invention. Polyhexamethylene adipamide polymer having a relative viscosity of 70 was extruded at a temperature of 290° C. and a rate of 21.5 lbs./hour (9.8 kg/hr) through a rectangular spinneret orifice having rounded corners (0.088×0.310 inches or 2.2×7.9 mm). The filament so formed was passed vertically downward through an air gap for 26 inches (0.66 m), quenched in a water bath at 32° C. for a distance of 12 feet (3.66 m) and passed to a feed roll having a surface speed of 141 ypm (129 meters/min). The filament was then passed through two oxyacetylene flames, supplied by a mixture of oxygen (at 10.7 psig or 74 KPa) and acetylene (at 4.3 psig or 30 KPa) fed through a common line to two nozzles of 0.028 inch (0.71 mm) diameter, in order to deorient the surface of the filament. The flames were directed countercurrent to the movement of the filament, at an angle of about 30° to the direction of the filament, and were adjusted so that they uniformly impinged the filament to insure even heating. The flame tips were positioned 3/16-¼ inch (4.8-6.4 mm) above and below the filament. The temperature of the filament surface was calculated to be 280°-300° C. at the hotest part of the flame treatment. The temperature calculation was based on actual temperature measurements, using a Barnes infrared measuring device, between 5 inches and 20 inches from the filament surface and extrapolating a plot of temperature versus distance. After the flame treatment, the filament was passed to first stage draw rolls heated to 145° C.

Between the feed roll and first stage draw rolls, the filament was stretched 3.85X. From the first stage rolls the filament was passed 5 times through a 30 inch (0.76 m) radiant heater at 875°-911° C. and then to second stage draw rolls running at a speed of 800 ypm (732 mpm) which stretched the flame treated and drawn filament an additional 1.48X for a total draw ratio of 5.7X. The filament was then wound onto a package. The filament formed was clear and transparent, had a denier of 2052 and a substantially flat, ribbon-shaped cross-section with a width of 0.274 mm and a thickness of 0.0790 mm. It had excellent tensile properties, and its surface was less oriented than its core as shown by parallel refractive index. Its surface was decidedly less permeable than a similar denier monofilament made by a steaming process (see Control) as shown by the two fold differences in hot, two-ply strip adhesion. Filament properties are given in Table 1.

The unique combination of properties of this Example, high transparency, low permeability, lower surface versus core orientation, outstanding straight and knot tensile properties, make it an excellent monofilament product and an ideal candidate for in-water applications such as fishing lines, ropes and cables.

CONTROL

This Example describes the preparation of 6,6 nylon monofilament by a process which was very similar to Example 1, with the principle difference being the substitution of a steaming unit in place of the flame unit between the feed and first-stage draw rolls.

A polyhexamethylene adipamide filament of 70 relative viscosity and ribbon-like cross-section was spun, quenched and passed to a feed roll exactly as in Example 1, except that the water bath was 36° C. (versus 32° C.). From the feed roll, the filament was passed through a steam chamber 28 inches (0.71 m) in length containing wet steam at 140 psig (965 kPa) and 179° C. (saturation temperature). After the steam treatment, the filament was passed to first stage draw rolls at ambient temperatures. Between the feed roll and first stage draw rolls, the filament was stretched 3.84X. From the first stage rolls the filament was passed 3X through a 48-inch (1.22 m) radiant heater heated to 947° C. near the entrance and 969° C. at the exit, and then to second stage draw rolls at 800 ypm (732 mpm) which stretched the steam-treated and drawn filament an additional 1.48X for a total draw ratio of 5.68X. The substantially flat, ribbon-like cross-section filament (0.274 mm×0.079 mm) was wound onto a package. Filament properties are given in Table 1.

The Control filament had excellent tensile properties. However, the filament was not clear and transparent as Example 1 but milky and translucent. In addition, the surface was more open and permeable, as indicated by the adhesion results. While the Control is an excellent monofilament for certain applications, such as tire cord, it is less than ideal for in-water applications, such as fishing lines, etc.

EXAMPLES 2-6

These Examples describe the preparation of a series of 6,6 nylon monofilaments with deniers from about 500 to about 4,000.

Polyhexamethylene adipamide of 70 relative viscosity was spun, quenched and drawn to a series of monofilaments under conditions that were the same as those of Example 1, except for the following. The polymer spinning throughputs and temperatures, water-bath quench temperatures and second-stage radiant heater temperatures were adjusted to accommodate each of the different deniers of Examples 2-6 as shown in Table 2. The other differences of Examples 2-6 as a group opposite Example 1 were: (1) the length of the quench air gap was 24″; (2) the pressure of oxygen was 7 psig and of acetylene was 5 psig leading to the flame; (3) first-stage draw roll temperature was 147° C.; and (4) the number of passes and length of each pass through the radiant heater were 3 and 50″, respectively. Other key processing parameters such as draw ratio split, total draw ratio, feed roll and windup roll speeds and spinneret cross-section were the same as in Example 1. The temperatures of the filaments were not measured or calculated. However, immediately after passing through the flame, the monofilaments had a glossy or "wet" appearance indicating that the temperature of the filament surface was at about or higher than the melting point (255°–263° C.).

The product properties of Examples 2-6 are listed in Table 1. The monofilaments of Examples 2-5 exemplify a unique combination of properties, including a very high level of clarity, superior tensiles and a filament surface parallel refractive index which is less than that of the core. Example 6, while acceptable in most respects, does not exemplify the high level of clarity, expressed in terms of % Transmitted Light, of Examples 1-5. Microscopic examination of the fiber of Example 6 indicates surface damage and the need to further optimize process conditions, particularly radiant heater temperature. With optimization of these conditions, clarity is expected to improve to well above 70.

EXAMPLE 7

Nylon 66 monofilaments prepared by both the process described in Example 1 and by the process described in U.S. Pat. No. 4,009,511 were evaluated by four expert fishermen. The monofilaments were about 2000 denier with a flat, ribbon-like cross-section of 3.0 modification ratio. The 40 lb. experimental lines were evaluated with regard to a number of parameters. The evaluations of the expert fishermen with regard to monofilaments prepared by both processes were as follows:

No problems in filling the reel;
Castability was excellent and the distance was greater than other conventional fishing lines;
Toughness was excellent and low abrasion and wear;
Breaking strength was excellent and higher than conventional fishing lines;
Stretch/Sensitivity was good;
Knot strength was excellent. Knot was made with a Palomar knot.

TABLE 1

| | Control | 1 | 2 | 3 | 4 | 5 | 6 |
|---|---|---|---|---|---|---|---|
| RV | 70 | 70 | 70 | 70 | 70 | 70 | 70 |
| ok | | | | | | | |
| Denier (Drawn) | 2070 | 2052 | 540 | 1080 | 1602 | 3150 | 4140 |
| Fiber Shape | Ribbon-Like | Ribbon-Like | Ribbon-Like | Ribbon-Like | Ribbon-Like | Ribbon-Like | Ribbon-Like |
| Tensiles: | | | | | | | |
| Straight Tenacity (gpd) | 8.4 | 8.4 | 8.9 | 8.2 | 8.4 | 8.7 | 8.8 |
| Straight Elongation (%) | 20 | 13 | 17 | 18 | 17 | 17 | 18 |
| Knot Tenacity (gpd) | 5.6 | 6.2 | 7.2 | 5.7 | 5.5 | 5.6 | 5.4 |
| Knot Elongation (%) | 13 | 11 | 11 | 11 | 11 | 13 | 14 |
| Parallel Refractive Index | | | | | | | |
| Surface - Long Side | 1.549 | 1.570 | 1.556/ 1.564 | 1.563/ 1.568 | 1.570 | 1.566/ 1.570 | 1.562 |

TABLE 1-continued

|  | Control | Example 1 | 2 | 3 | 4 | 5 | 6 |
|---|---|---|---|---|---|---|---|
| Core | >1.57 | 1.577/1.581 | 1.577/1.586 | 1.578/1.580 | 1.576/1.579 | 1.576/1.579 | 1.572 |
| Thickness of Surface Layer (Microns) | 4–6 | 9 | 20–30 | 30 | 15 | 12 | 12 |
| Hot, 2-Ply Strip Adhesion (lbs) | 51 | 27 | 9 | 27 | 32 | 41 | 38 |
| Transmitted Light (%) | 57 | 82 | 68 | 78 | 74 | 72 | 62 |

TABLE 2

|  | Example 2 | 3 | 4 | 5 | 6 |
|---|---|---|---|---|---|
| Polymer Throughput (lbs./hr.) | 5.4 | 10.8 | 16.1 | 32.2 | 43.0 |
| Polymer Spinning Temp. (°C.) | 292 | 292 | 292 | 292 | 291 |
| Water-Bath Quench Temp (°C.) | 36 | 38 | 38 | 30 | 24 |
| Second-Stage Radiant Heater (°C.) | 724–728 | 712–718 | 717 | 796 | 868–947 |

What is claimed:

1. In a process including the steps of spinning, quenching and drawing a heavy denier thermoplastic monofilament in at least two draw stages to a total draw ratio of at least 5.0X, liquid quenching the monofilament, advancing the quenched monofilament in at least one draw stage, wherein it is orientation-stretched at a ratio of at least 3.0X, and then advancing the monofilament through a zone heated with a radiant heater at a temperature of 600°–1300° C. and drawing the monofilament wherein the monofilament is orientation-stretched at a ratio of at least 1.3X, the improvement comprising: drying the monofilament surface after quenching the monofilament and heating the quenched, surface dried monofilament by flame before the last at least 1.3X increment of draw ratio.

2. The process of claim 1, wherein the quenched, surface dried monofilament is heated by flame before drawing in the first drawing stage.

3. The process of claim 2, the improvement further comprising passing the quenched monofilament through the flame to yield a monofilament surface temperature of from 20° C. below the monofilament melting point to 40° C. above the monofilament melting point.

4. The process of claim 3 wherein the thermoplastic monofilament is a polyamide monofilament.

5. The process of claim 4 wherein the RV of the polyamide monofilament is at least 50.

6. The process of claim 5 the improvement further comprising passing the monofilament through an air gap 10 to 40 inches (25–100 cm) in length before quenching.

7. The process of claim 6, the improvement further comprising quenching the monofilament in a water bath, wherein the monofilament is in the water bath for a distance greater than 80 inches (200 cm).

8. The process of claim 7 wherein the RV of the polyamide monofilament is at least 70.

* * * * *

UNITED STATES PATENT AND TRADEMARK OFFICE
CERTIFICATE OF CORRECTION

PATENT NO. : 4,921,668
DATED : May 1, 1990
INVENTOR(S) : Robert Keith Anderson
Michael Herbert Mainz It is certified that error appears in the above—identified patent and that said Letters Patent is hereby corrected as shown below:

On the cover page listing Inventors:

Please delete "; Robert L. Rackley, Parkersburg, W. Va."

Signed and Sealed this

Fifteenth Day of June, 1993

Attest:

Attesting Officer

MICHAEL K. KIRK

Acting Commissioner of Patents and Trademarks